United States Patent
Kishida et al.

(10) Patent No.: US 6,775,440 B2
(45) Date of Patent: Aug. 10, 2004

(54) OPTICAL MODULE AND CARRIER FOR OPTICAL MODULE

(75) Inventors: Yuji Kishida, Kizu-cho (JP); Keiko Oda, Nara (JP)

(73) Assignee: Kyocera Corporation, Kyoto (JP)

( * ) Notice: Subject to any disclaimer, the term of this patent is extended or adjusted under 35 U.S.C. 154(b) by 323 days.

(21) Appl. No.: 09/843,002

(22) Filed: Apr. 25, 2001

(65) Prior Publication Data

US 2001/0036337 A1 Nov. 1, 2001

(30) Foreign Application Priority Data

Apr. 28, 2000 (JP) .......................... 2000-130986
Nov. 29, 2000 (JP) .......................... 2000-363504

(51) Int. Cl.[7] ................................................ G02B 6/30
(52) U.S. Cl. ......................................... 385/49; 385/147
(58) Field of Search ............................ 385/14, 39, 49, 385/147, 88–94, 131, 31, 52, 47, 54, 42, 46, 122; 372/6, 32; 257/98, 59, 65, 66, 72, 347, 351, 177, 113, 659, 250; 359/173, 248

(56) References Cited

U.S. PATENT DOCUMENTS 5,719,979 A * 2/1998 Furuyama .................... 385/89
5,929,500 A * 7/1999 Yoneda et al. ............... 257/432
5,960,141 A * 9/1999 Sasaki et al. .................. 385/88
6,130,444 A * 10/2000 Hashizume et al. .......... 257/81
6,227,723 B1 * 5/2001 Masuda et al. ............... 385/88
6,236,788 B1 * 5/2001 Moisel ......................... 385/52
6,285,808 B1 * 9/2001 Mehlhorn et al. ............. 385/14
6,377,385 B1 * 4/2002 Saito .......................... 359/248
6,467,972 B2 * 10/2002 Setoguchi ..................... 385/88
6,512,861 B2 * 1/2003 Chakravorty et al. ......... 385/14
6,575,641 B2 * 6/2003 Yamabayashi et al. ....... 385/88

* cited by examiner

*Primary Examiner*—Akm Enayet Ullah
(74) *Attorney, Agent, or Firm*—Hogan & Hartson LLP

(57) ABSTRACT

In a mounting structure of an optical module, an optical semiconductor device such as a light emitting device or a photo sensing device and an optical fiber are mounted. The optical fiber is directly mounted in a mounting groove formed on a top face of the substrate. The optical semiconductor device is mounted on a front face of a carrier corresponding to {110} surface or {100} surface equivalent to (110) surface or (100) surface of a single crystalline silicon. The carrier has a slanted first positioning face corresponding to {111} surface equivalent to (111) surface of the single crystalline silicon. The substrate has a slanted second positioning face corresponding to {111} surface equivalent to (111) surface of the single crystalline silicon with respect to the top face corresponding to {110} surface or {100} surface of the single crystalline silicon. Thus, the front face of the carrier becomes perpendicular to the top face of the substrate.

19 Claims, 18 Drawing Sheets

OPTICAL MODULE AND CARRIER FOR OPTICAL MODULE

BACKGROUND OF THE INVENTION

1. Field of the Invention

This invention relates to a carrier for optical semiconductor device and a mounting structure thereof used in optical fiber communication system or optical local area network, and further relates to an optical semiconductor module on which optical wave guide elements such as the carrier for optical semiconductor device, an optical fiber coupled thereto and an optical wave guide channel are mounted.

2. Description of the Related Art

In recent years, optical fiber communication is realized in fields of cable television (CATV) and public data network. Furthermore, an optical module having high speed and high accuracy is realized by a module structure called "coaxial type" or "dual-inline type". These elements are practiced mainly in a field called "trunk line".

On the other hand, another optical module is developed by using a technology for mounting an optical semiconductor device and an optical fiber on a silicon substrate with high positioning accuracy owing to mechanical precision. This optical module is aimed to be practiced mainly in a field called "subscriber system", so that it is required to be downsized, to be thinner and to be inexpensive.

Examples of conventional mounting structure of a surface sensing type optical semiconductor device (photodiode) are described.

FIG. 26 shows an example of a carrier (mounting base) 40 having a cubic shape. A photodiode will be mounted on the carrier 40. Electrodes 411 and 412, to which anode and cathode of the photodiode are respectively connected, are formed on adjoining first face 41 and second face 42 of the carrier 40. Portions of the electrodes 411 and 412 on the first face 41 are electrically connected to the other portions on the second face 42 at the boundary of the first face 41 and the second face 42.

FIG. 27 shows that the optical semiconductor device such as a PIN type photodiode 20 is mounted on the carrier 40. A size of the photodiode 20 is, for example, a square of about 500 $\mu$m and a thickness of about 200 $\mu$m. A photo sensing area of the photodiode 20 is a circular having a diameter about 200 $\mu$m. An electrode 21 formed on a photo sensing plane is electrically connected with the electrode 412 by a bonding wire 31. Another electrode 22 formed on a rear face is directly connected with the electrode 411 by a connecting element such as a solder of AuSn.

FIGS. 28A to 28C show a mounting structure of the carrier 40 with the photodiode 20 on a silicon substrate 30. The photodiode 20 is held in a manner so that the photo sensing plane is vertical to a principal plane of the silicon substrate 30 via the carrier 40. By such a configuration, an optical fiber (not shown in the figure) mounted in parallel with the principal plane on the silicon substrate 30 is optically coupled with the photodiode 20. The portions of the electrode 411 and 412 on the first face 41 are respectively connected to electrodes (not shown) formed on the silicon substrate 30 by bonding wires 32 and 33, so that electric power can be supplied to the photodiode 20. The carrier 40 is generally formed by a ceramic material such as alumina. The electrodes 411 and 412 on the carrier 40 are formed on the first face 41 and the second face 42 of the carrier 40 by printing method using a paste including a filler.

In a process for forming the electrodes 411 and 412 on the first face 41 and the second face 42 of the carrier 40, the portions of the electrodes 411 and 412 on the first face 41 and the other portions of them on the second face 42 cannot be formed at the same time. At first, the carrier 40 is disposed in a manner so that the first face 41 be disposed at the top end. The portions of the electrodes 411 and 412 on the first face 41 are formed. After that, the carrier 40 is picked up and turned by a handle so that the second face 42 be disposed at the top. Subsequently, the other portions of the electrodes 411 and 412 on the second face 42 are formed. Thus, the process for forming the electrode 411 and 412 on the first face 41 and the second face 42 of the carrier 40 is complex, and the productivity thereof is much lower.

Furthermore, accuracy of the relative position of the portions of the electrode 411 and 412 on the first face 41 and the other portions of them on the second face 42 depends on the positioning accuracy of the carrier 40 by the handle, so that the gap between the electrodes 411 and 412 and the width of them cannot be made so narrower, for example, less than about 70 $\mu$m. This limitation of the width of the electrodes 411 and 412 disturbs to decrease the impedance of the electrodes 411 and 412, to improve the high frequency characteristics of the optical semiconductor device and to downsize the optical semiconductor module.

Furthermore, the smaller the size of the carrier becomes, the more difficult to handle the carrier, so that the productivity becomes much lower. Thus, it is substantially impossible to downsize the carrier smaller than the cubic having each side length of 2 mm by the conventional method.

In other words, the size and the cost of the carrier for optical semiconductor device are in a relation of trade off, so that the cost of the carrier becomes very expensive by downsizing and high accuracy of the carrier, and there are physical limitations in the downsizing and high accuracy.

Another mounting structure of the photodiode directly mounted on the silicon substrate without using the carrier is shown in Publication Gazette of Japanese Patent Application Hei 8-94887. A slant face, on which the photodiode is fixed, is formed on the silicon substrate at a position on production of mounting groove for the optical fiber. When the optical fiber and the photodiode are mounted on the silicon substrate, the exit plane of the optical fiber faces the photo sensing plane of the photodiode but they are not parallel. The electrode on the rear face of the photodiode directly contacts the electrode formed on the slant face, and the electrode on the photo sensing plane is connected to the electrode by the bonding wire.

Since the electrode of the photodiode is slanted with respect to the principal plane, the wiring process for connecting the electrode of the photodiode and the electrode on the silicon substrate becomes very difficult. Furthermore, the angle of the slant surface with respect to the principal plane of the silicon substrate is restricted by workability for forming and/or for wiring the electrode on the slant face, so that tolerances of photosensitivity and positioning of the photodiode become smaller than those when the photo sensing plane of the photodiode is disposed perpendicular to the optical path of the light beam emitted from the optical fiber.

Still another method for mounting the photodiode directly on the silicon substrate is shown in Publication Gazette of Japanese Patent Application Hei 9-54228. A total reflection mirror having a reflection angle about 45 degrees with respect to the exit plane of the optical fiber is formed on an end of the mounting groove for the optical fiber on the silicon substrate. The photodiode is directly mounted on the silicon substrate in a manner so that a part of the photo sensing plane overhangs for facing the mirror. An optical path of a light beam emitted from the exit plane of the optical fiber is bent about 90 degrees toward the photo sensing plane of the photodiode by the mirror.

Since the total reflection mirror is formed on an end of the mounting groove, the shape and the manufacturing process of the mounting groove becomes complex. A part of the photo sensing plane of the photodiode is used for mounting the photodiode on the silicon substrate, so that the reduction of the sensitivity of the photodiode is inevitable.

For solving the problems in the above-mentioned conventional mounting structure, a carrier for optical semiconductor device having a slant face with the same angle as that of the slant face on the silicon substrate can be used in a manner so that the slant faces are parallel and directly contact with each other. By such a configuration, the photo sensing plane of the photodiode mounted on the carrier can be perpendicular to the optical axis of the optical fiber.

Positioning of the photodiode in a z-direction parallel to the optical axis of the optical fiber and a y-direction parallel to the height of the optical module can be adjusted by sliding the slant faces. Positioning of the photodiode in an x-direction perpendicular to the y-direction and the z-direction, however, depends on the shape of the silicon substrate formed by dicing, so that the photodiode cannot be positioned in the x-direction precisely. Thus, this mounting structure can be used for mounting the photodiode having relatively large tolerance, but it is considered not to satisfy the positioning accuracy of a data transmission module or a high frequency module using a surface emitting optical semiconductor device.

SUMMARY OF THE INVENTION

An object of the present invention is to provide a carrier for optical semiconductor device suitable for mounting, especially a surface emitting or sensing semiconductor device, having high productivity, downsized and splendid high frequency characteristic. Another object of the present invention is to provide a mounting structure of the optical semiconductor device and the optical module using the same.

A carrier for optical semiconductor device in accordance with the present invention has a device mounting face on which at least one optical semiconductor device is to be mounted and at least one positioning face slanted by a predetermined angle with respect to the device mounting face and disposed below a position at which the optical semiconductor device is mounted.

A mounting structure of the optical semiconductor device in accordance with the present invention comprises a carrier having the above-mentioned configuration and a substrate having at least one positioning face slanted by a predetermined angle with respect to a top face thereof.

An optical module in accordance with the present invention comprises a carrier and a substrate respectively having the above-mentioned configurations and at least one optical semiconductor device mounted on the device mounting face of the carrier and an optical fiber mounted on the top face of the substrate so as to be optically coupled with the optical semiconductor device.

When the carrier with the optical semiconductor device is fixed on the substrate, the positioning face of the carrier is contacted with the positioning face of the carrier, so that the device mounting face of the carrier has a predetermined angle, such as 90 degrees with respect to the top face of the substrate. Thus, the optical semiconductor device mounted on the carrier can be optically coupled with the optical fiber mounted on the substrate.

DETAILED DESCRIPTION OF THE EMBODIMENT

First Embodiment

Figure 1:
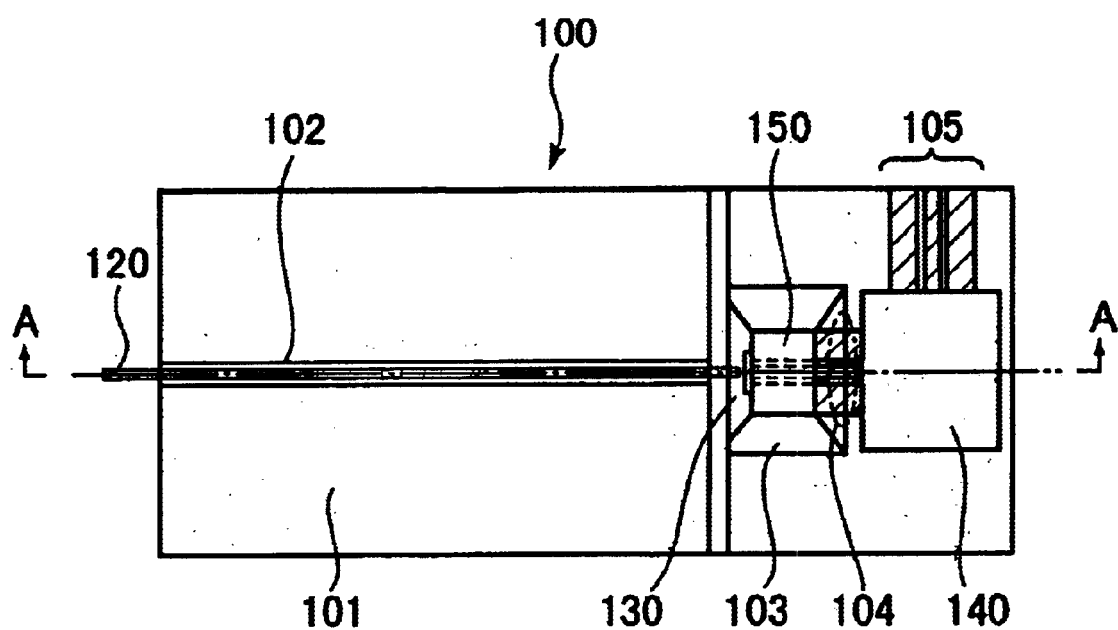
FIG. 1 is a plan view for showing a configuration of an optical module in a first embodiment of the present invention.
Figure 2:
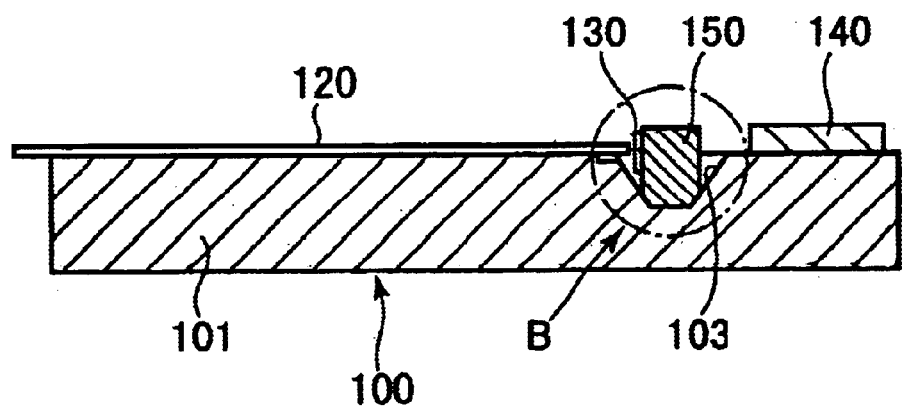
FIG. 2 is a A—A sectional view of the optical module in FIG. 1.

A first embodiment of the present invention is described with reference to figures. FIG. 1 shows a plan view of an optical module 100 in the first embodiment. FIG. 2 shows A—A section of the optical module 100.

A substrate 101 is made of single crystalline silicon having a principal plane of (100) surface or (110) surface. A mounting groove 102 having V-shaped section in a direction perpendicular to A—A line is formed on a top face of the substrate 101. An optical fiber 120 is disposed on the mounting groove 102 in a manner so that the optical axis of the optical fiber 120 is parallel to the bottom line of the V-shaped section of the mounting groove 102. A quadrangular pyramid shaped cavity 103 is formed on the production of the mounting groove 102. A carrier (mounting base) 150 for optical semiconductor device is fixed on a bottom of the cavity 103. A photodiode 130 is mounted on a front face of the carrier 150 in a manner so that an incident plane of the photodiode faces an exit plane of the optical fiber 120. The photodiode 130 serving as an optical semiconductor device in this embodiment is a rear incidence type PIN photodiode in which an incident light beam enters from a rear face opposite to photo sensing region. In the photodiode 130, a PIN structure of InGaAs is laminated on a substrate of InP. A driving circuit 140 including a preamp is further mounted on the top face of the substrate 101. Electrode patterns 104 and 105, which are to be electrically connected to the photodiode 130 and the driving circuit 140 for supplying electric power thereto and for transmitting signals thereto and therefrom, are formed on the top face of the substrate 101. The electrodes 104 and 105 are coplanar wave type ones made of Au, Cu, Al, or an alloy including at least one of them.

Figure 3:
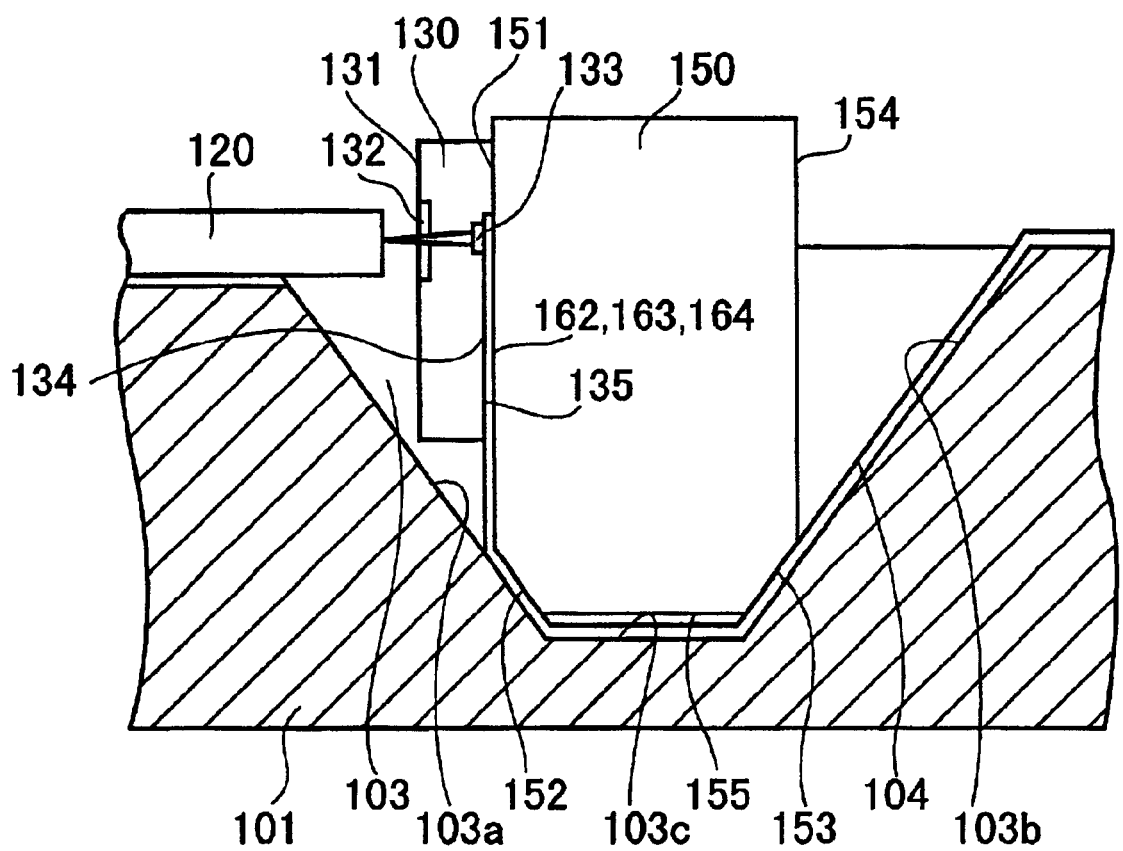
FIG. 3 is an enlarged sectional view for showing a detailed configuration in an area designated by a symbol "B" in FIG. 2.

FIG. 3 shows a detailed configuration in an area designated by a symbol "B" in FIG. 2. The cavity 103 is precisely formed for having a trapezoid section by anisotropic etching of the substrate 101 owing to alkali solution, or the like. Slant faces 103a and 103b of the cavity 103 correspond to {111} surface of the single crystalline silicon. A part of the electrode pattern 104 is formed on the slant faces 103a, 103b and a bottom face 103c. In the cavity 103, electrodes formed on the carrier 150 are connected to the electrode pattern 104 so as to drive the photodiode 130. The electrode pattern on the carrier 150 will be described below.

Figure 4A:
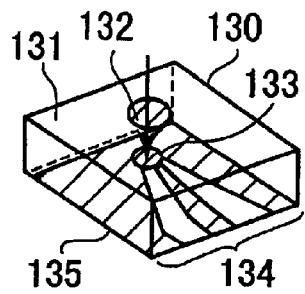
FIG. 4A is a perspective view for showing a configuration of a rear incident type PIN photodiode used as an optical semiconductor device in the first embodiment.
Figure 4B:
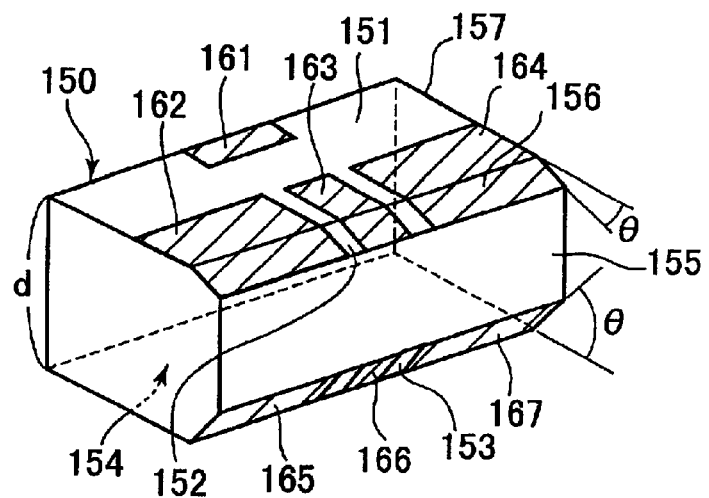
FIG. 4B is a perspective view for showing a configuration of a carrier in the first embodiment.
Figure 4C:
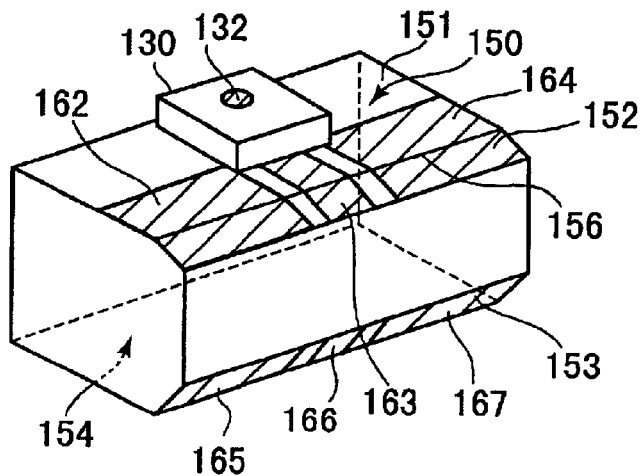
FIG. 4C is a perspective view for showing a configuration of a subassembly of the photodiode on the carrier in the first embodiment.

FIG. 4A shows a configuration of the photodiode 130. FIG. 4B shows a configuration of the carrier 150. FIG. 4C shows a subassembly of the photodiode 130 mounted on the carrier 150.

As can be seen from FIG. 4A, an antireflection coating film 132 made of, for example, $SiN_x$ is provided on the rear face 131 of the photodiode 130. A light beam emitted from an optical fiber enters into the photodiode 130 from the portion of the antireflection coating film 132 on the rear face 131. In other words, the rear face 131 of the photodiode 130 serves as the incident plane. The light beam entering into the photodiode 130 moves toward a photo sensing portion 133 in the photodiode 130. For example, coplanar wave type electrodes 134 are formed on a front face 135 of the photodiode 130.

As can be seen from FIG. 4B, the carrier 150 has a front face 151 on which the photodiode 130 is mounted, a first slant face 152 having an angle θ with respect to the front face 151, a rear face 154 parallel to the front face 151 with a distance "d", a second slant face 153 having an angle θ with respect to the rear face 154, and a bottom face 155 between the first slant face 152 and the second slant face 153 and perpendicular to the front face 151. When the (110) surface of the single crystalline silicon is used as the front face 151, the angle θ should be 35.26 degrees. Alternatively, when (100) surface of the single crystalline silicon is used as the front face 151, the angle θ should be 54.74 degrees.

Electrode patterns 162, 163 and 164, which will be used for driving the photodiode 130, are formed on the front face 151, and the electrodes 162, 163 and 164 are extendedly formed on the first slant face 152. Electrode patterns 165, 166 and 167 are formed on the second slant face 153. Since the coplanar wave type electrodes 134 having a predetermined pattern are formed on the front face 135 of the photodiode 130, at least the electrodes 162 to 164 are the coplanar wave type ones. Gaps between the electrodes 162 to 164 are adjusted so that impedance of them be 50 Ω. Alternatively, when the electrodes 134 on the photodiode 130 are not the coplanar wave type ones, it is not necessary to form the electrodes 162 to 164 as the coplanar wave type ones. The electrodes 134 on the photodiode 130 can be connected to other electrodes by using bonding wires.

As can be seen from FIGS. 3 and 4C, the photodiode 130 is mounted on the carrier 150 in a manner so that the front face 135 directly contacts the front face 151 of the carrier 150. The electrodes 134 on the front face 135 of the photodiode 130 are electrically connected to the electrodes 162 to 164 on the front face 151 of the carrier 150. The electrode 161 is used for fixing the photodiode 130 on the carrier 150. Furthermore, when the carrier 150 with the photodiode 130 is mounted in the cavity 103 of the substrate 101, the electrodes 162 to 164 are electrically connected to the electrodes 104 on the substrate 101.

As mentioned above. the (110) surface or (100) surface of the single crystalline silicon can be used as the front face 151 of the carrier 150. Silicon has large dielectric dissipation factor, so that it is preferable to use one having a high resistance equal to or more than 1000 Ω.cm. The dielectric constant value 11.8 of silicon is larger than that of 9 of alumina. The size of the carrier 150 in this embodiment, however, can be downsized much smaller than that in the conventional one, so that the parasitic capacity of the mounting structure of the optical semiconductor device in this embodiment can be reduced about 0.02 pF which is much smaller than that about 0.3 pF owing to the conventional mounting structure. When a thin film of $SiO_2$ having a thickness about 100 $\mu$m is formed the silicon substrate 101, and the electrodes are formed thereon, it is possible to reduce the parasitic capacity and to reduce the transmission loss due to the dielectric dissipation factor.

Figures 5A, 5B:
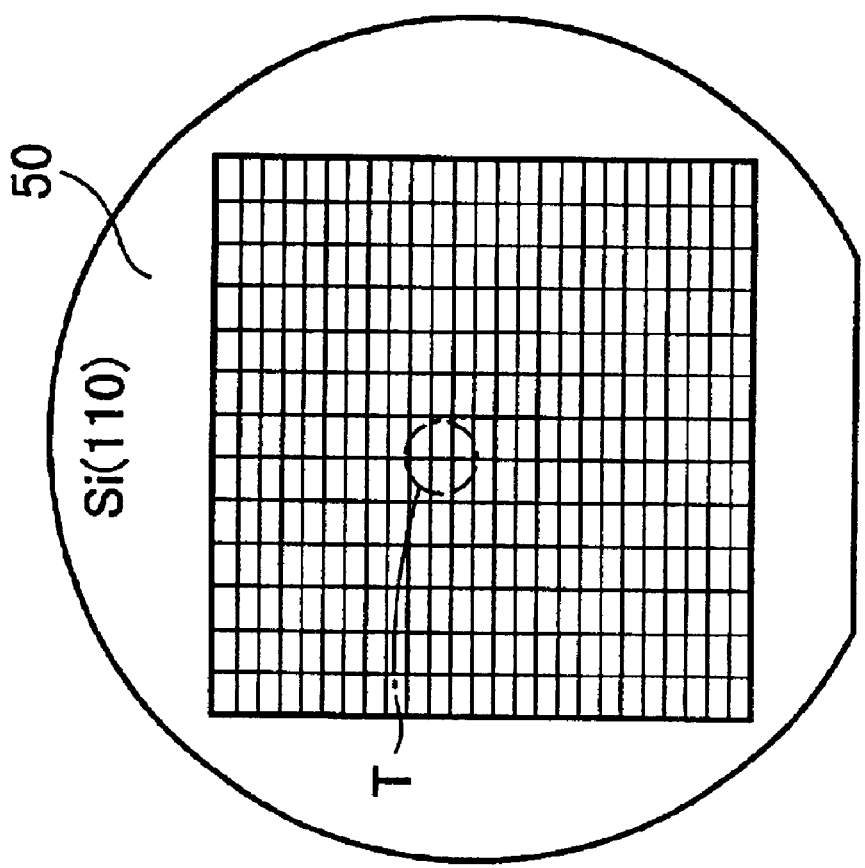
FIG. 5A is a plan view for showing a silicon wafer from which a plurality of the carrier can be manufactured.
FIG. 5B is a side view of the silicon wafer.
Figure 5D:
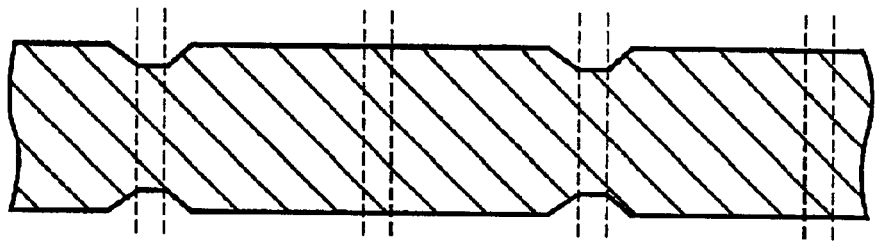
FIG. 5D is a sectional view of the silicon wafer.
Figure 5C:
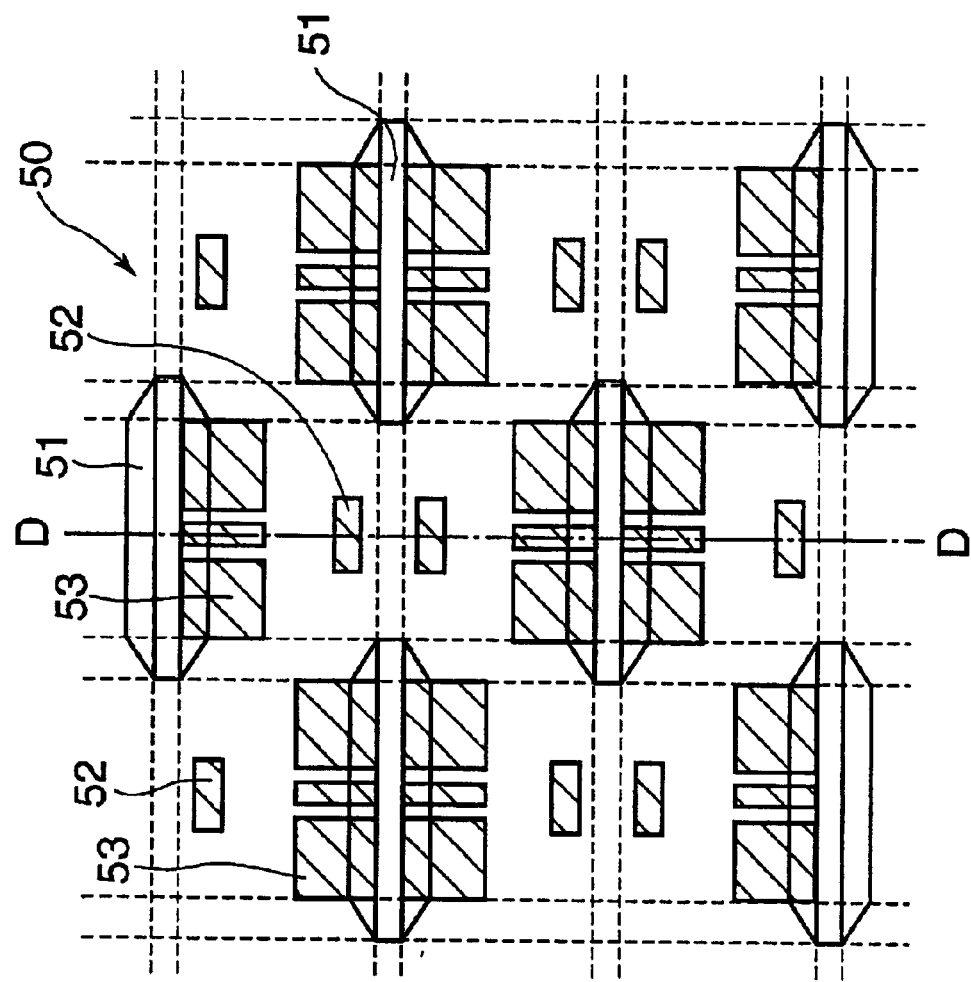
FIG. 5C is an enlarged plan view for showing a detailed configuration on a principal plane of the silicon wafer.

A method for manufacturing the carrier 150 in this embodiment is described with reference to FIGS. 5A to 5D. FIG. 5A shows a plan view of a silicon wafer 50, and FIG. 5B shows a side view thereof. FIG. 5C shows an enlarged detailed configuration in a region designated by a symbol "T" in FIG. 5A. FIG. 5D shows D—D section of the silicon wafer in FIG. 5C.

The (110) surface of the single crystalline silicon is used as the principal plane of the silicon wafer 50. At first, thermal oxidation films are formed on top and bottom surfaces of the silicon wafer 50. Predetermined convex and concave patterns are formed on the top and bottom faces of the silicon wafer 50 by partially etching the thermal oxidation films owing to photolithography method. The silicon wafer 50 is dipped in alkali solution such as KOH solution so as to executing the anisotropy etching to the silicon wafer 50. By such the processes, the first slant face 152 and the second slant face 153 of {111} surface having the slant angle of 35.26 degrees with respect to the (110) surface can be formed precisely. The above-mentioned processes can be used for a silicon wafer using the (100) surface as the principal plane. In the latter case, the first slant face 152 and the second slant face 153 of {111} surface having the slant angle of 54.74 degrees with respect to the (100) surface can be formed precisely.

As can be seen from FIG. 3, when the carrier 150 with the photodiode 130 is mounted in the cavity 103 of the substrate 101, the first slant face 152 and the second slant face 153 of the carrier 150 respectively contact with the slant faces 103a and 103b of the cavity 103. Thus, position of the photodiode 130 on the carrier 150 with respect to the principal plane of the substrate 101 in a direction perpendicular to the principal plane depends on the thickness "d" of the carrier 150, the thickness of the electrodes 104, 152 and 153, and the thickness of the connection element such as the solder. In other words, when the photodiode 130 on the front face 151 of the carrier 150 is positioned with respect to an upper edge 156 of the first slant face 152, the above-mentioned position of the photodiode 130 with respect to the principal plane of the substrate 101 is mainly governed by the thickness of the silicon wafer 50.

On the contrary, width and depth of grooves 51 formed on the top face and the bottom face of the silicon wafer 50 and the positioning accuracy of the grooves on the top face with respect to those on the bottom face of the silicon wafer 50 are not so important in comparison with the accuracy of the position of the photodiode 130 with respect to the principal plane of the substrate 101 (or the thickness of the silicon wafer 50), so that it becomes easier to form the grooves 51 and to control the manufacturing process thereof.

When the grooves 51 are formed on the top face and the bottom face of the silicon wafer 50, conductive patterns 52 and 53 for the electrodes 161 to 167 and dicing markers (not shown) used in dicing process are formed on the top face and the bottom face of the silicon wafer 50 by photolithography method, as shown in FIG. 5C. The electrodes 162 to 164 will be used as markers for identifying images in mounting process of the photodiode 130 on the carrier 150, so that the conductive patterns 53 is aligned with respect to the edges of the grooves 51 and the dicing markers.

For spreading photoresist uniformly of the surfaces of the silicon wafer 50 having grooves 51, a method for using a spray can be used. A kind of the photoresist is not restricted, so that both of a negative type and a positive type ones can be used.

When the conductive patterns 52 and 53 and the dicing markers are formed on the top face and the bottom face of the silicon wafer 50, unnecessary portions are cut by the dicing process, so that a plurality of the carriers 150 are manufactured from one silicon wafer 50.

By the above-mentioned manufacturing processes of the carrier 150, linearity and positioning accuracy of the conductive patterns including the electrodes can be improved than those by the conventional method such as printing method, so that the width and gap of the patterns can be made narrower. Furthermore, a large number of the carriers 150 can be manufactured from the same silicon wafer by the same processes, so that troublesome processes such as picking up and turning of the carriers in the conventional manufacturing processes are unnecessary. Thus, the productivity of the carriers 150 can be increased much higher by the manufacturing processes in this embodiment.

Subsequently, mounting processes of the photodiode 130 on the carrier 150 is described. The photodiode 130 is disposed on the front face 151 of the carrier 150 by a flip chip mounting machine in a manner so that the electrodes 134 on the photodiode 130 contact the electrodes 161 to 164 on the front face 151 of the carrier 150. A soldering paste is previously spread on the electrodes 161 to 164. When the photodiode 130 is precisely disposed on the carrier 150, the soldering paste is melted by heating, so that the photodiode 130 is fixed on the carrier 150 after the cooling thereof. The soldering paste includes a solder such as AuSi system, AuSn system, PbSn system, and so on.

The positioning of the photodiode 130 on the carrier 150 is executed by identifying the patterns of the antireflection coating film 132 on the rear face 131 of the photodiode 130 and the patterns of the electrodes 162 to 164 on the front face 151 of the carrier 150 in the images thereof, and adjusting the position of the photodiode 130 with respect to the carrier 150 so as to correspond to a predetermined designed positioning relation. As mentioned above, the electrodes 162 to 164 serving as the markers in the mounting processes have good linearity and position accuracy, so that the photodiode 130 can precisely be positioned on the carrier 150.

When the subassembly of the photodiode 130 on the carrier 150 is completed, the carrier 150 is held on a collet by vacuum absorption, and moved into the cavity 103 on the substrate 101. When the vacuum absorption of the collet is released, the subassembly is disposed on the bottom of the cavity 103. Subsequently, the carrier 150 is pressed toward the substrate 101 and heated. The soldering paste is previously spread on a portion of the electrode 104 on which the electrodes 162 to 167 on the carrier 150 contact, so that the carrier 150 is fixed on the substrate 101 by melting and solidification of the soldering paste.

When the (110) surface is used as the front face 151 of the carrier, the (100) surface of the single crystalline silicon as the principal plane of the substrate 101. Alternatively, when the (100) surface is used as the front face 151 of the carrier, the (110) surface of the single crystalline silicon as the principal plane of the substrate 101. By such the configuration, not only the front face 151 on which the photodiode 130 is mounted can be held substantially perpendicular to the principal plane of the substrate 101, but also the first slant face 152 and the second slant face 153 of the carrier 150 can tightly be contact with the slant faces 103a and 103b of the cavity 103. As a result, the photodiode 130 can be mounted on the substrate 101 via the carrier 150 with high positioning accuracy. The position of the antireflection coating film 132 serving as a photo sensing region of the photodiode 130 in the direction perpendicular to the principal plane of the substrate 101 is governed by the thickness "d" of the silicon wafer 50, thickness of the connection element such as the solder, and the distance from the upper edge 156 of the first slant face 152. The position of the antireflection coating film 132 in the direction parallel to the principal plane of the substrate 101 is governed by a distance from a dicing edge 157 of the carrier 150 (see FIG. 4B).

Finally, the optical fiber 120 is disposed on the mounting groove 102 of the substrate 101, so that the optical fiber 120 is optically coupled to the photodiode. The positioning accuracy of the photo sensing region of the photodiode 130 relative to a center axis (core axis) of the optical fiber 120 depends on the accuracy of the shape of the carrier 150 and the positioning accuracy of the photodiode 130 on the carrier 150, so that precise optical connection can be realized by the optical module 100 in this embodiment.

In the above-mentioned first embodiment, the rear incidence type PIN photodiode is used as the optical semiconductor device. The present invention is not restricted by the description of the embodiment. It is possible to apply the present invention for mounting a front incidence type PIN photodiode, an avalanche photodiode, or the like.

Second Embodiment

Figure 6:
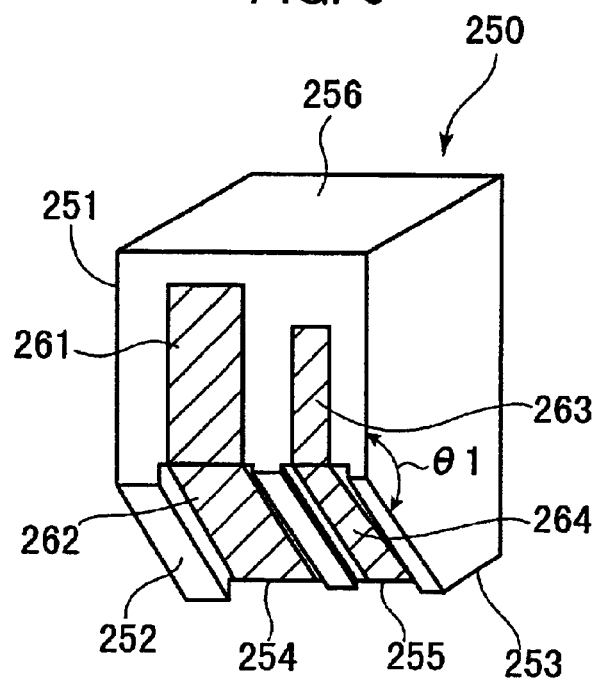
FIG. 6 is a perspective view for showing a configuration of a carrier in a second embodiment of the present invention.
Figure 7:
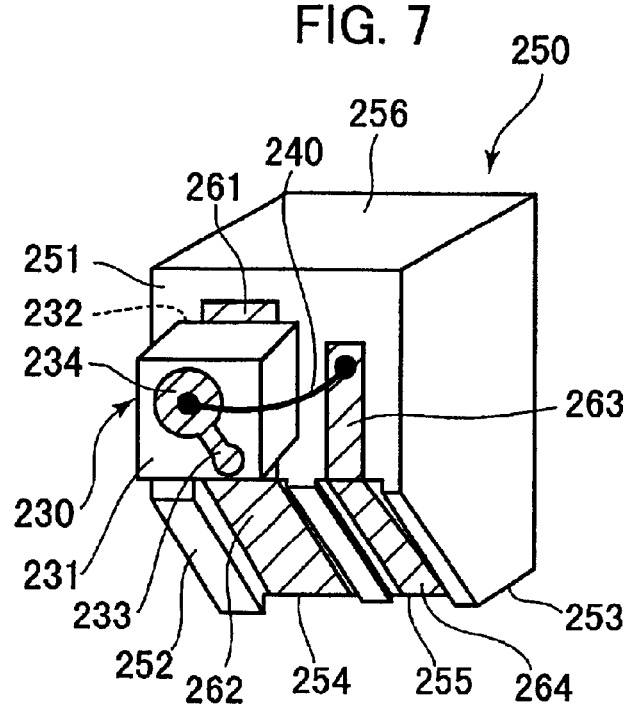
FIG. 7 is a perspective view for showing a configuration of a subassembly of an optical semiconductor device mounted on the carrier in the second embodiment.

A second embodiment of the present invention is described with reference to figures. FIG. 6 shows a configuration of a carrier 250 in the second embodiment. FIG. 7 shows a configuration of a subassembly of an optical semiconductor device 230 mounted on the carrier 250.

The carrier 250 has a front face 251 on which an optical semiconductor device such as a light emitting device or a photo sensing device, a slant face 252 having an angle θ1 with respect to the front face 251 by which a position of the carrier 250 on a substrate is governed, a top face 256 and a bottom face 253 which are formed by dicing process for forming the carrier 250.

Two positioning guide grooves 254 and 255 are formed on the slant face 252. Electrodes 261 and 263 are formed on the front face 251 and electrodes 262 and 264 are respectively formed on the bottom faces of the positioning guide grooves 254 and 255. The electrodes 261 and 263 are respectively electrically connected to the electrodes 262 and 264 on the edge portions of the front face 251 and the slant face 252. The positioning guide grooves 254 and 255 are formed, for example, by a reactive ion etching method or by a chemical dry etching method.

In the second embodiment, the slant face 252 is a specific face of a crystal having the slant angle θ1 with respect to front face 251. The slant face 252, however, is not restricted by the adjoining face to the front face 251. It is possible to intermediate at least one face between the front face 251 and the slant face 252.

The electrodes 261 and 263 are used to be connected by optical semiconductor device, and the electrodes 262 and 264 are used to be connected to external electrodes. The electrodes 262 and 264 are not necessarily formed on the positioning guide grooves 254 and 255.

When the carrier 250 is formed from a single crystalline silicon, alternative of the {110} surface equivalent to the (110) surface and the {100} surface equivalent to the (100) surface is used as the front face 251, and the {111} surface equivalent to the (111) surface is used as the slant face 252.

The optical semiconductor device 230 is, for example, a surface light emitting semiconductor device having a light emitting region 233 on a front face 231 and an electrode formed on a rear face 232 opposite to the front face 231. For mounting the optical semiconductor device 230 on the carrier 250 as shown in FIG. 7, the rear face 232 of the optical semiconductor device 230 is directly disposed on the front face 251 of the carrier 250 in a manner so that the electrode on the rear face 232 directly contacts the electrode 261 on the front face 251 of the carrier 250. An electrode 234 on the front face 231 of the optical semiconductor device 230 is electrically connected to the electrode 263 on the front face 251 of the carrier 250 by a bonding wire 240.

Figure 8:
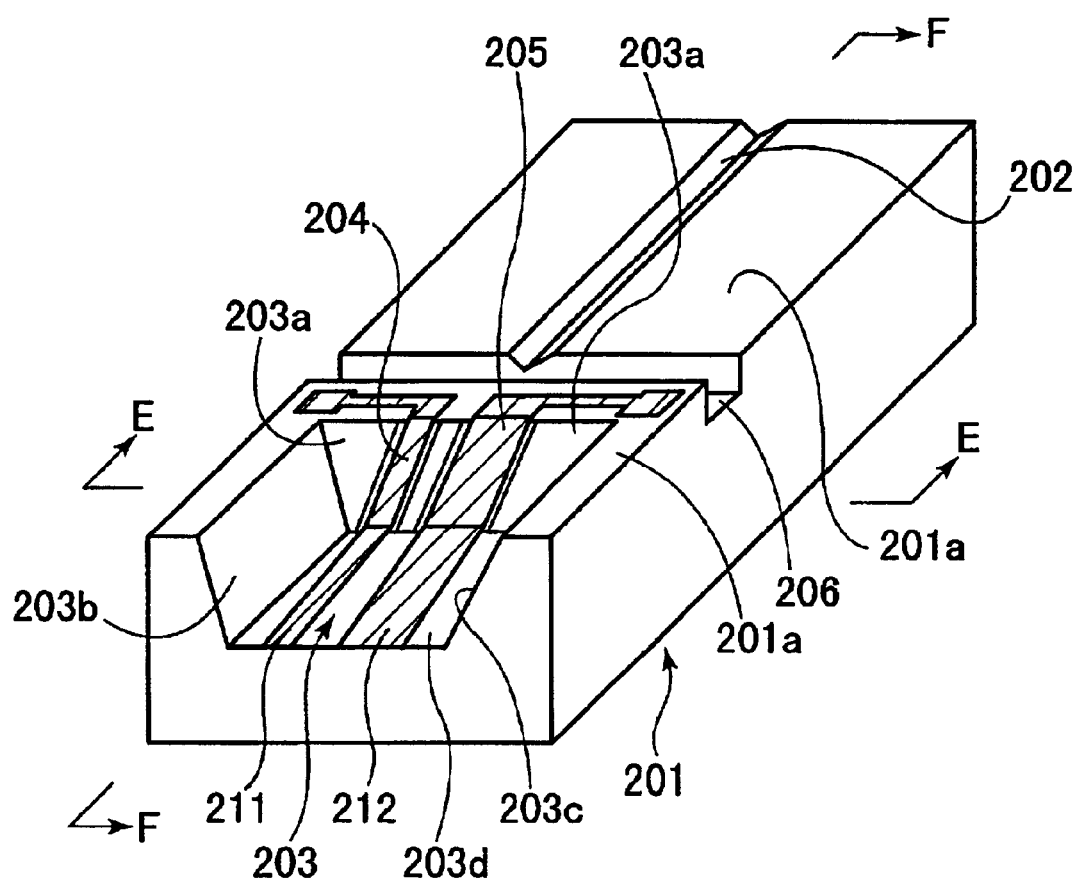
FIG. 8 is a perspective view for showing a configuration of a substrate in the second embodiment.
Figure 9:
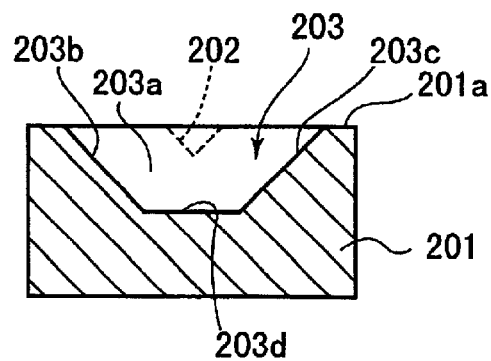
FIG. 9 is a sectional view for showing a configuration of E—E section of the substrate in FIG. 8.
Figure 10:
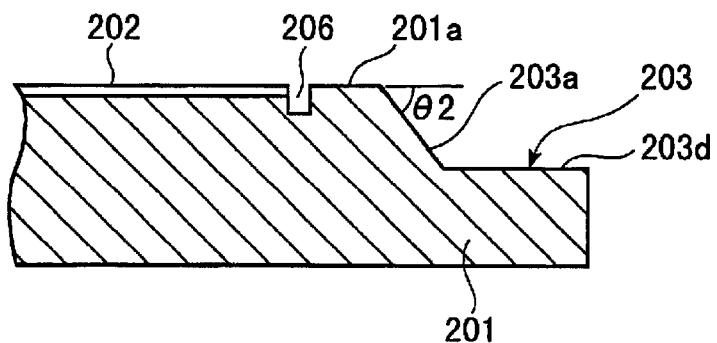
FIG. 10 is a sectional view for showing a configuration of F—F section of the substrate in FIG. 8.
Figure 11:
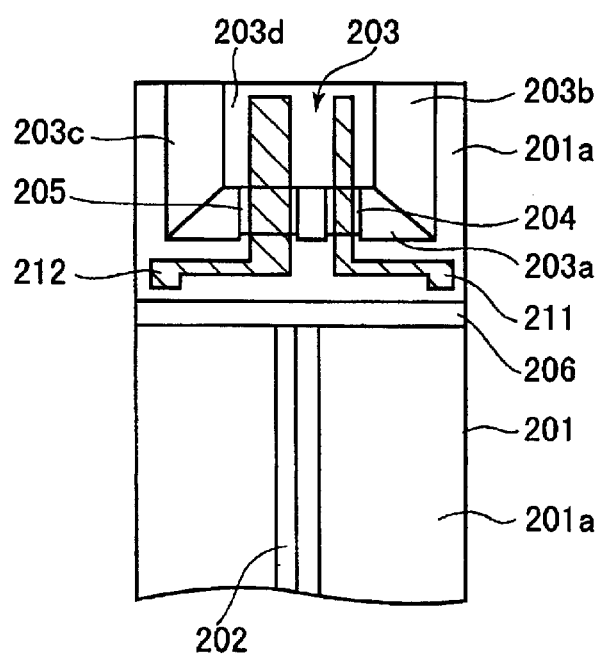
FIG. 11 is a plan view for showing a configuration of the substrate in FIG. 8.

FIG. 8 shows a configuration of a substrate 201 in the second embodiment. FIG. 9 shows E—E section of the substrate 201. FIG. 10 shows F—F section of the substrate 201. FIG. 11 shows a plan view of the substrate 201.

The substrate 201 is, for example, made of a single crystalline silicon, and has a mounting groove 202 having V-shaped section, a hollow 203 and a channel 206. The hollow 203 has three slant faces 203a, 203b and 203c and a bottom face 203d. The slant faces 203a to 203c has a slant angle θ2 with respect to a top face 201a of the substrate 201. The hollow 203 is formed, for example, by an anisotropy wet etching method. An optical fiber 220 will be mounted in the mounting groove 202. The channel 206 is provided perpendicular to the mounting groove 202 so as to stop the end of the optical fiber.

In the second embodiment, the optical semiconductor device 230 is to be mounted on the substrate 201 via the carrier 250 in a manner so that the light emitting region 233 of the optical semiconductor device 230 be perpendicular to the top face 201a of the substrate 201. When the front face 251 of the carrier 250 is (110) surface, the top face 201a of the substrate 201 should be the (100) surface. Alternatively, when the front face 251 of the carrier 250 is (100) surface, the top face 201a of the substrate 201 should be the (110) surface. The slant face 203a is to be the {111} surface equivalent to the (111) surface.

Two positioning protrusions 204 and 205 are further formed on the slant face 203a corresponding to the slant face 252 of the carrier 250 by, for example, the reactive ion etching method or the chemical dry etching method. By such a configuration, the carrier 250 can firmly be held on the substrate 201 by the engagement of the positioning guide grooves 254 and 255 of the carrier with the positioning protrusions 204 and 205 on the substrate 201. Engaging structure of the carrier 250 with the substrate 201 is not restricted by the grooves and the protrusions. It is possible to use at least one set of a hole and a protrusion engaged with each other.

When the top face 201a of the substrate 201 is the (100) surface, the slant angle θ2 becomes 54.74 degrees. Alternatively, when the top face 201a of the substrate 201 is the (110) surface, the slant angle θ2 becomes 35.26 degrees.

Electrodes 211 and 212 are formed on the bottom face 203d, on the protrusions 204 and 205 on the slant face 203a and the top face 201a of the substrate 201, so that the electrodes 262 and 264 on the carrier 250 will be connected thereto when the carrier 250 is mounted on the substrate 201.

Figure 12:
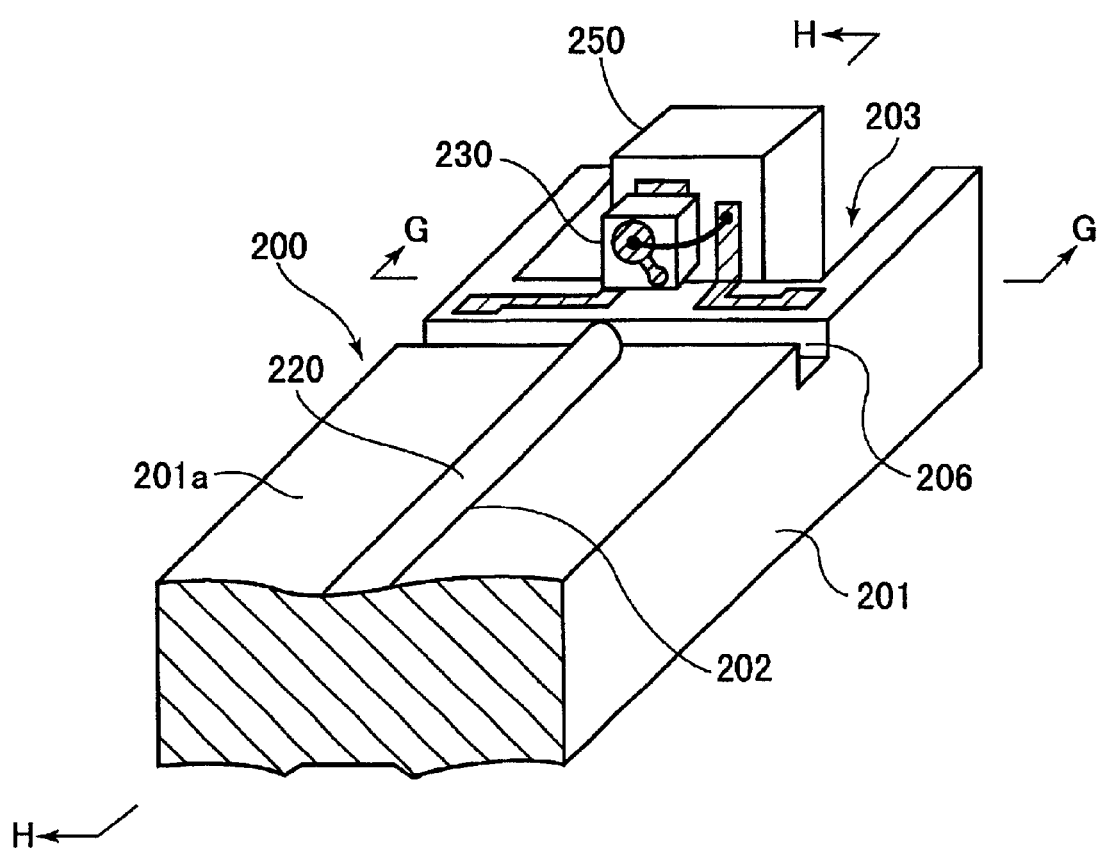
FIG. 12 is a perspective view for showing a configuration of an optical module in the second embodiment.
Figure 13:
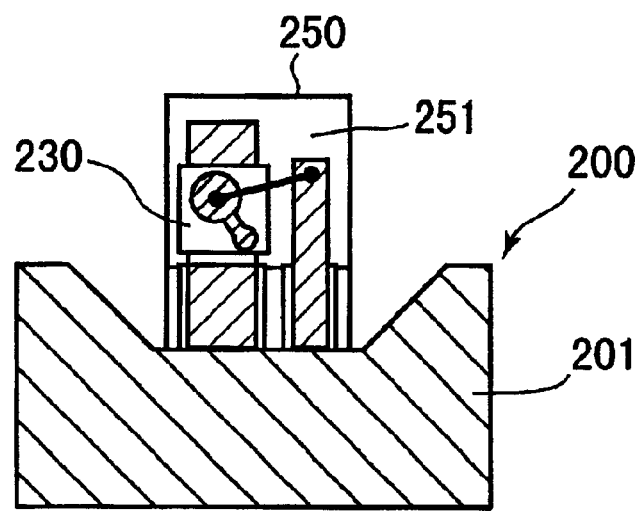
FIG. 13 is a sectional view for showing a configuration of G—G section of the optical module in FIG. 12.
Figure 14:
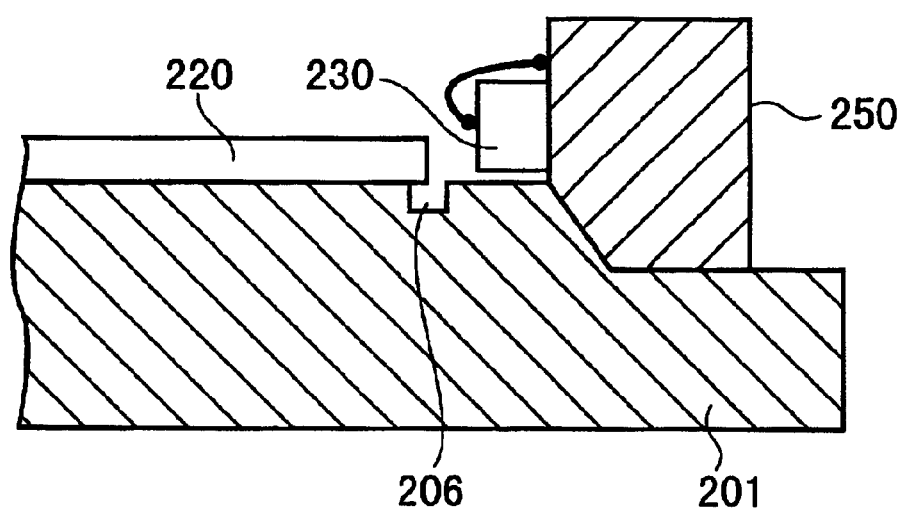
FIG. 14 is a sectional view for showing a configuration of H—H section of the optical module in FIG. 12.
Figure 15:
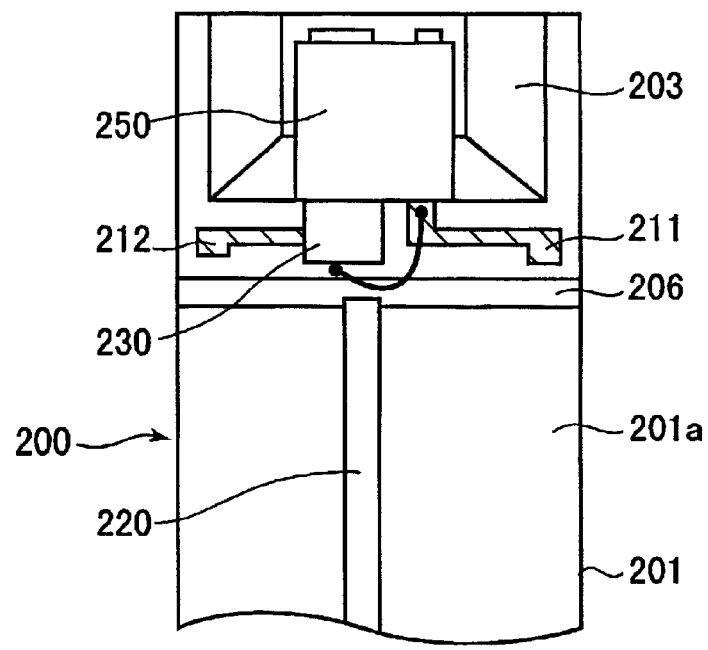
FIG. 15 is a plan view for showing a configuration of the optical module in FIG. 12.
Figure 16:
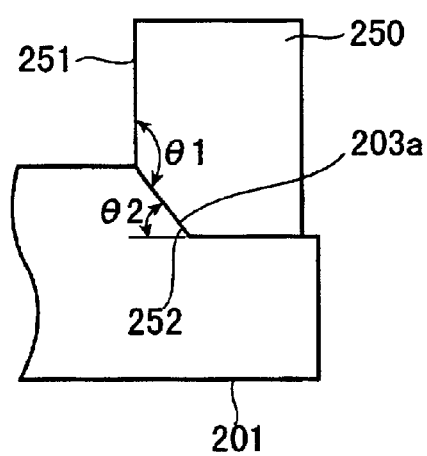
FIG. 16 is a partial side view for showing a relation between slant angles θ1 and θ2.

FIG. 12 shows an optical module 200 in the second embodiment, in which the optical semiconductor device 230 is mounted on the substrate 201 via the carrier 250. FIG. 13 shows G—G section of the optical module 200. FIG. 14 shows H—H section of the optical module 200. FIG. 15 shows a plan view of the optical module 200. FIG. 16 shows a relation between the slant angles θ1 and θ2.

As mentioned above, the carrier 250 is mounted on the substrate 201 in a manner so that the positioning guide grooves 254 and 255 on the slant face 252 engage with the guiding protrusions 204 and 205. The carrier 250 and the substrate 201 are fixed by an adhesive or a solder under a condition that the carrier 250 is pressed toward the substrate 201. The optical semiconductor device 230 is mounted in a manner so that the light emitting region 233 becomes vertical to the top face 201a of the substrate 201. When the optical fiber 220 is mounted on the mounting groove 202, the end face of the optical fiber 220 face the light emitting region 233 of the optical semiconductor device 230. Thus, the optical fiber 220 and the optical semiconductor device 230 can be connected effectively. Electric power can be supplied to the optical semiconductor device 230 from an external electric power supply through bonding wires (not shown) connected to the electrodes 211 and 212, the electrodes 211 and 212 on the substrate 201, the electrodes 261 to 264 on the carrier 250, and the bonding wires 240.

Since the top face 256 and the bottom face 253 of the carrier 250 are formed by the dicing process, the bottom face 253 of the carrier 250 is disposed on the bottom face 203d of the hollow 203 of the substrate 201. Portions of the electrodes 211 and 212 on the bottom face 203d can be omitted. Alternatively, when the wiring space cannot be kept on the top face 201a of the substrate 201, it is possible to connect the electrodes 211 and 212 to the external electric power supply by the bonding wires at the portions of the electrodes 211 and 212 on the bottom face 203d.

As mentioned above, the slant face 252 of the carrier 250 and the slant face 203a of the substrate 201 are formed by the specific surfaces of the crystal, so that the carrier 250 can be mounted on the substrate 201 in a manner so that the front face 251, on which the optical semiconductor device 230 is to be mounted, has a predetermined angle such as 90 degrees with respect to the top face 201a of the substrate 201. Furthermore, the carrier 250 is positioned on the substrate 201 by the engagement of the positioning guide grooves 254 and 255 and the positioning protrusions 204 and 205, so that the positioning error of the optical semiconductor device 230 mounted on the front face 251 of the carrier 250 with respect to the optical fiber 220 mounted on the mounting groove 202 formed on the top face 201a of the substrate 201 can be reduced and they can be optically coupled with a suitable coupling characteristics. As a result, the optical module 200 having a high coupling characteristics can be obtained.

A method for manufacturing the above-mentioned carriers 250 is described with reference to the figures.

Figure 17A:
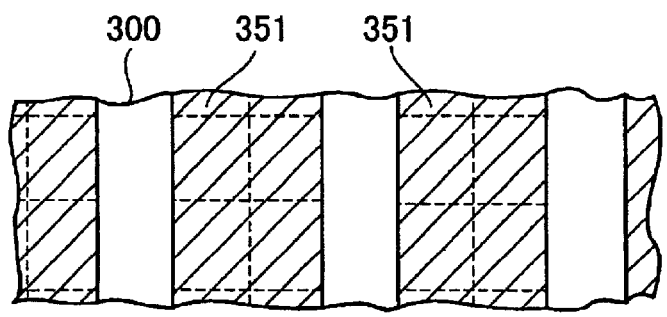
FIG. 17A is a partial plan view for showing a manufacturing process of carriers in the second embodiment.
Figure 17B:
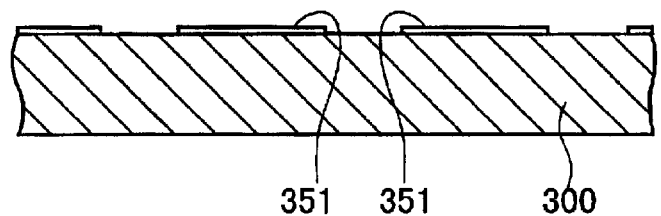
FIG. 17B is a sectional side view of FIG. 17A.

At first, a thin film such as $SiO_2$, $SiN_x$, lamination of $SiO_2/SiN_x$ is formed on a single crystalline silicon wafer 300 using the (110) surface as the principal plane by a method such as a thermal oxidation method, a plasma CVD (chemical vapor deposition) method, or a sputtering method. After a predetermined resist pattern is formed on the thin film by a photolithography method, masking films 351 having a desires pattern is formed on the silicon wafer 300 by etching method such as a reactive ion etching (RIE) method, a chemical etching (CDE) method, or an etching method using a buffer hydrofluoric acid (BHF), as shown by FIGS. 17A and 17B.

Figure 18A:
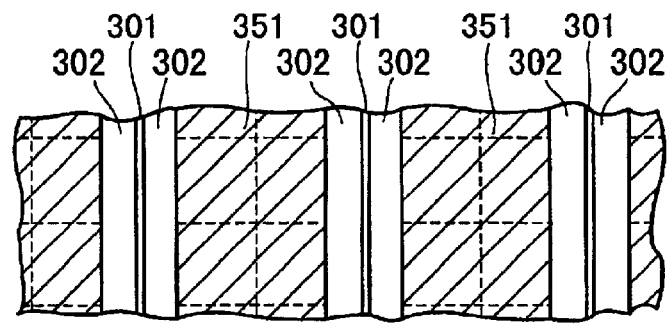
FIG. 18A is a partial plan view for showing the manufacturing process of carriers in the second embodiment.
Figure 18B:
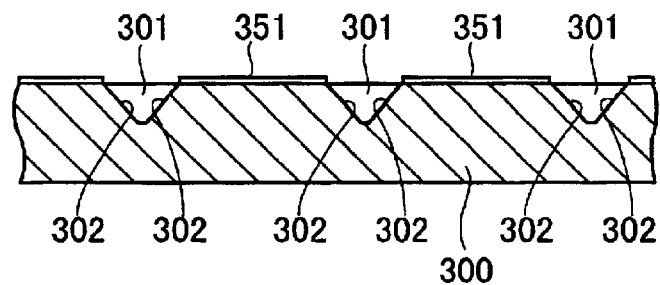
FIG. 18B is a sectional side view of FIG. 18A.

Subsequently, the opening portions of the masking films 351 are etched by an anisotropy etching method using a solution of KOH (potassium hydroxide), NaOH (sodium hydroxide), or TMAH (tetra-methyl-ammonium hydroxide). As a result, V-shaped grooves 301 having slant faces 302 of the {111} surface equivalent to the (111) surface are formed on the silicon wafer 300, as shown in FIGS. 18A and 18B. The slant faces 302 will be used as the slant face 252 of the carrier 250.

Figure 19A:
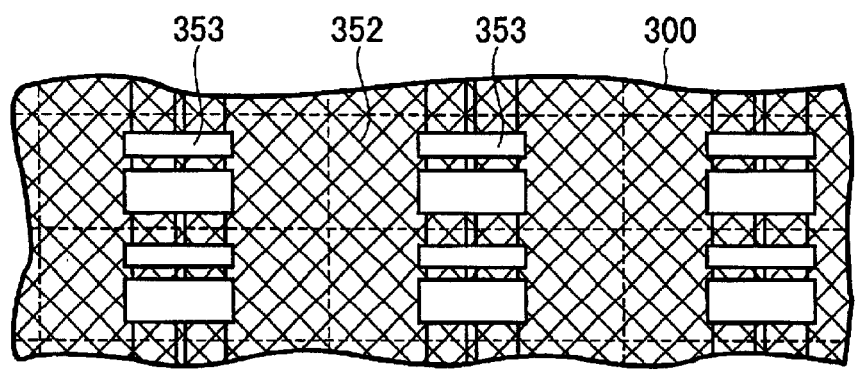
FIG. 19A is a partial plan view for showing the manufacturing process of carriers in the second embodiment.
Figure 19B:
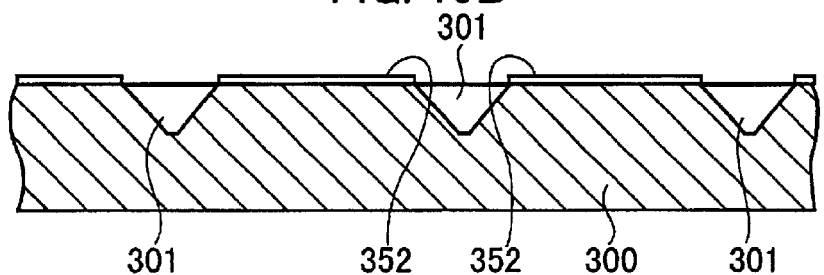
FIG. 19B is a sectional side view of FIG. 19A.
Figure 20A:
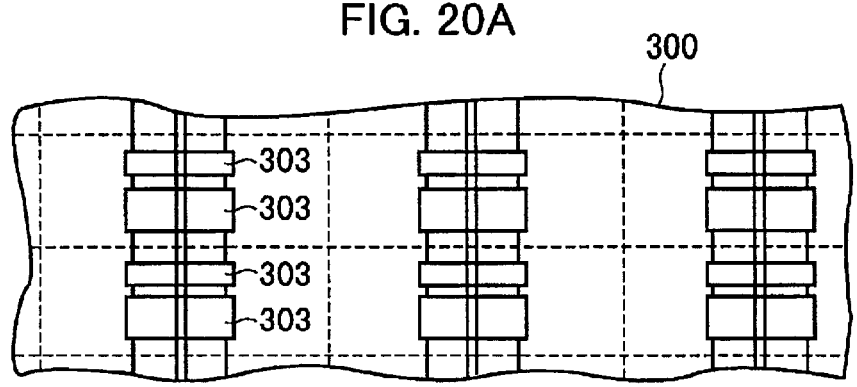
FIG. 20A is a partial plan view for showing the manufacturing process of carriers in the second embodiment.
Figure 20B:
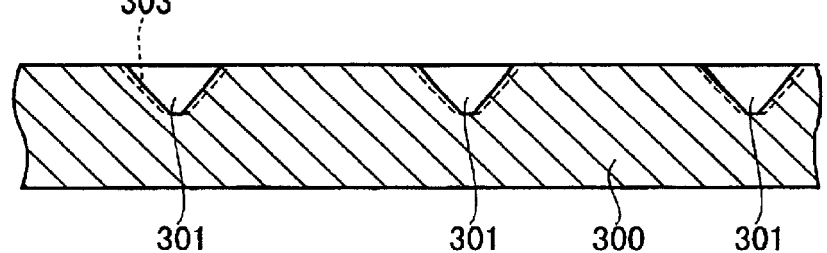
FIG. 20B is a sectional side view of FIG. 20A.

When the V-shaped grooves 301 are formed, a photoresist 352 having openings 353 disposed at positions corresponding to the positioning grooves 254 and 255 is formed on the silicon wafer 300, as shown in FIGS. 19A and 19B. Subsequently, the portions on the surfaces of the V-shaped grooves 301 are etched by a dry etching method such as the RIE method or the CDE method. As a result, concave portions 303, which will be serve as the positioning grooves 254 and 255, are relatively formed, as shown in FIGS. 20A and 20B.

Figure 21A:
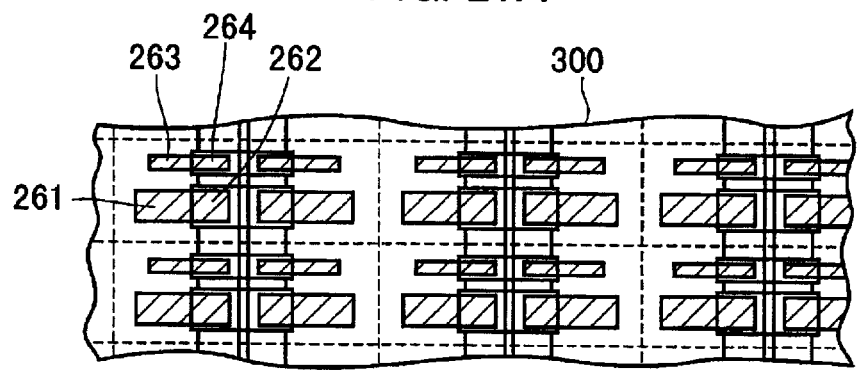
FIG. 21A is a partial plan view for showing the manufacturing process of carriers in the second embodiment.
Figure 21B:
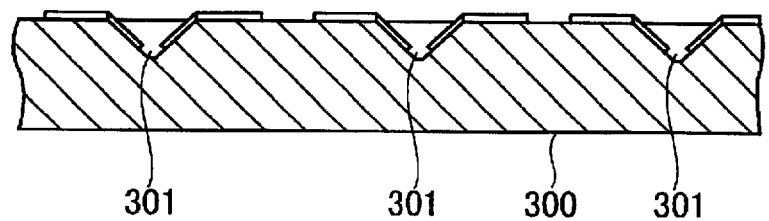
FIG. 21B is a sectional side view of FIG. 21A.

Subsequently, conductive patterns serving ad the electrodes 261 to 264 are formed on the concave portions 303 in the V-shaped groove 301 and the surfaces of the silicon wafer 300, as shown in FIGS. 21A and 21B.

Figure 22A:
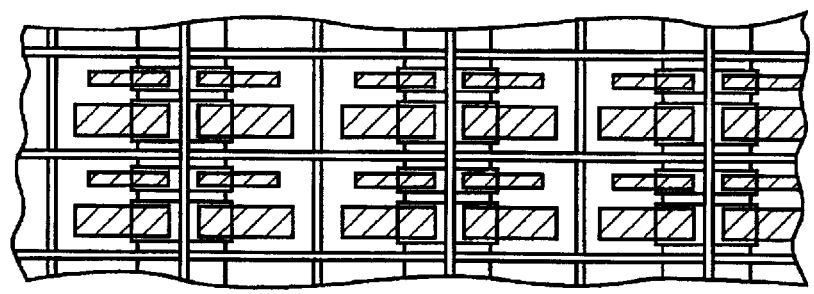
FIG. 22A is a partial plan view for showing the manufacturing process of carriers in the second embodiment.
Figure 22B:
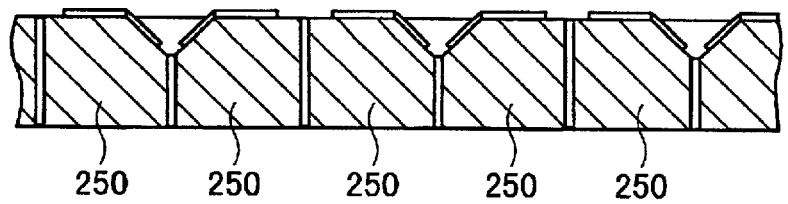
FIG. 22B is a sectional side view of FIG. 22A.

Finally, a plurality of the carriers 250 are cut from the same silicon wafer 300 by a dicing process, as shown in FIGS. 22A and 22B. As a result, many carriers 250 can be manufactured by the same processes from the same silicon wafer 300.

The substrate 201 shown in FIG. 8 can be manufactured by substantially the same processes as the above-mentioned manufacturing processes of the carrier 250. Since the electrodes 211 and 212 on the substrate 201 is formed not only on the top face 201 and the slant face 203a but also the bottom face 203d as occasion demands, it is preferable to provide an insulation film layer such as $SiO_2$ on the portion of the electrodes 211 and 212 on the bottom face 203d for preventing the shortcircuitting between the electrodes 211 and 212 due to the flow of the solder from the portion of the electrodes 211 and 212 on the slant face 203a when the gap between the electrodes 211 and 212 is narrower.

Third Embodiment

A third embodiment of the present invention is described. In the above-mentioned first and second embodiments, only one of the photo sensing device or the light emitting device is mounted on the substrate.

Figure 23:
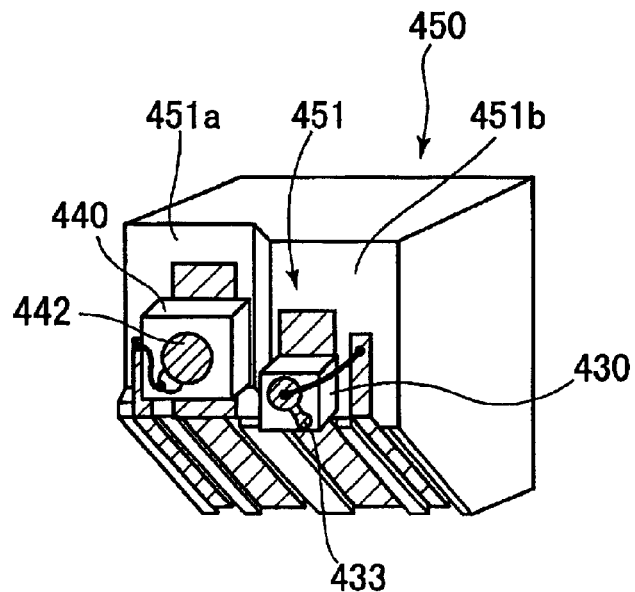
FIG. 23 is a perspective view for showing a configuration of a subassembly of optical semiconductor devices mounted on a carrier in a third embodiment of the present invention.
Figure 24:
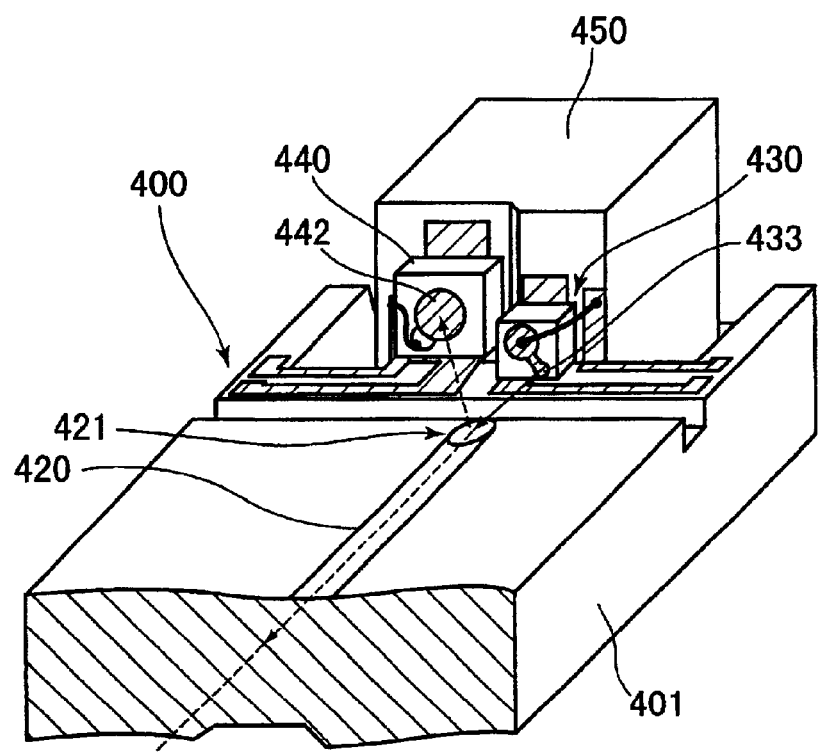
FIG. 24 is a perspective view for showing a configuration of an optical module in the third embodiment.

FIG. 23 shows a configuration of a subassembly of a light emitting device 430 and a photo sensing device 440 mounted on a carrier 450 in the third embodiment. FIG. 24 shows a configuration of an optical module 400 in the third embodiment.

As can be seen from the figures, two optical semiconductor devices such as the light emitting device 430 and the photo sensing device 440 are mounted on the same substrate 450, so that electrodes for supplying electric power to the optical semiconductor devices or for transmitting electric signals from the optical semiconductor devices are provided double on the carrier 450 and the substrate 401.

An end face 421 of an optical fiber 420 is not parallel with but slanted with respect to a light emitting region 433 of the light emitting device 430 so that a part of light beam emitted from the light emitting device 430 is reflected toward the photo sensing device 440 by the end face 421 of the optical fiber 420. The photo sensing device 440 receives the light beam reflected by the end face 421 of the optical fiber 420 for monitoring the output of the light emitting device 430.

Direction of the cross-section of the optical fiber 420 perpendicular to the end face 421 is governed by a position of a photo sensing region 442 of the photo sensing device 440. For example, when the light emitting region 433 of the light emitting device 430 and the photo sensing region 442 of the photo sensing device 440 are on the same level with respect to the principal plane (top face) of the substrate 401, the cross-section of the optical fiber 420 perpendicular to the end face 421 becomes parallel to the principal plane of the substrate 401. Under this condition, the end face 421 of the optical fiber 420 is polished so as to have a slant angle about 30 degrees with respect to a face perpendicular to the optical axis of the optical fiber 420.

Hereupon, it is considered that the position of the light emitting device 430 is fixed and the position of the photo sensing device 440 is moved on the same plane of the light emitting device 430. When the position of the photo sensing device 440 is departed from the position of the light emitting device 430, it is necessary to reflect the light beam emitted from the light emitting device 430 at a large angle toward the photo sensing device 440 by the end face 421 of the optical fiber 420, so that the slant angle of the end face 421 of the optical fiber 420 becomes much larger.

On the contrary, a first portion 451a of the front face 451 of the carrier 450 is offset behind from a second portion 451b in this embodiment, as shown in FIG. 23. The photo sensing device 440 is mounted on the first portion 451a and the light emitting device 430 is mounted on the second portion 451b. By such a configuration, even when a relative position of the photo sensing device 440 with respect to the light emitting device 430 in a direction parallel to the front face 451 of the carrier 450 is the same, the photo sensing region 442 of the photo sensing device 440 is positioned farther. As a result, the slant angle of the end face 421 of the optical fiber 420 can be made smaller.

Figure 25:
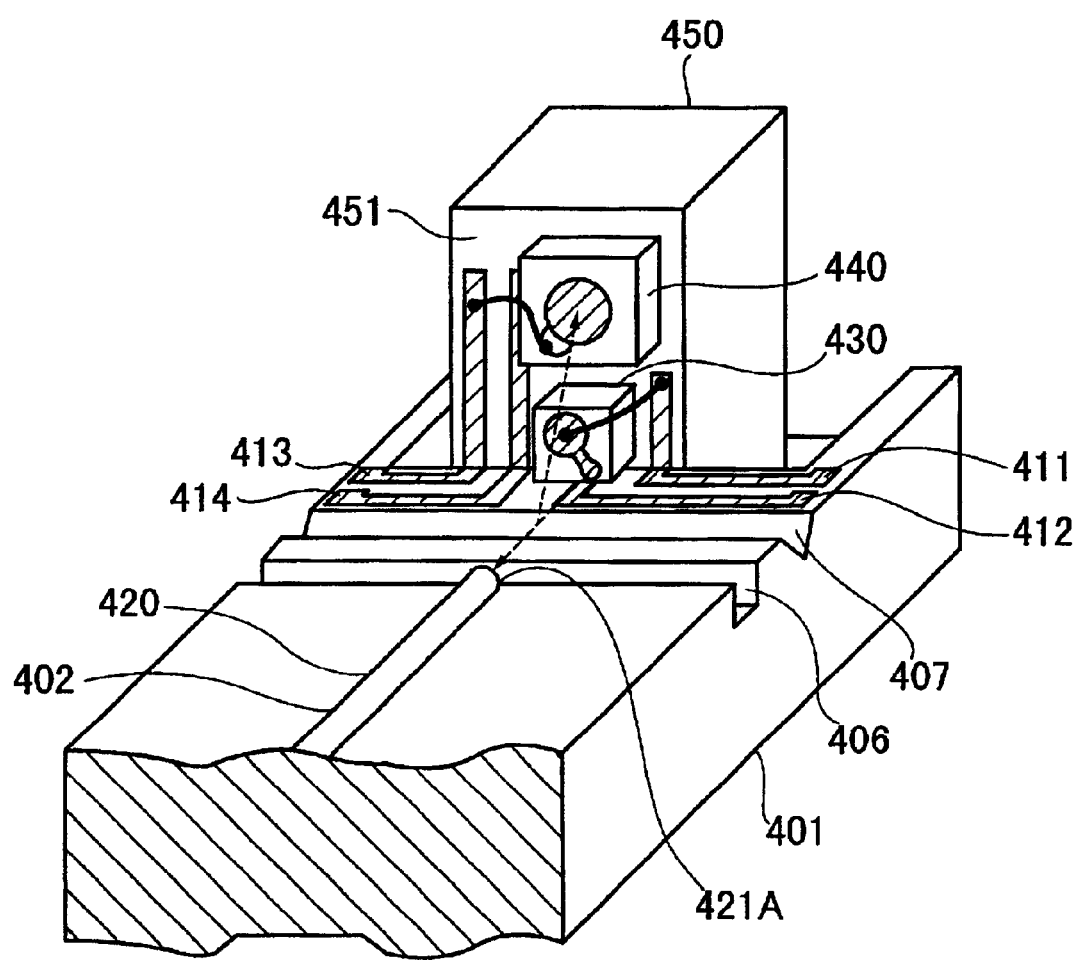
FIG. 25 is a perspective view for showing a configuration of a modification of an optical module in the third embodiment.
Figure 26:
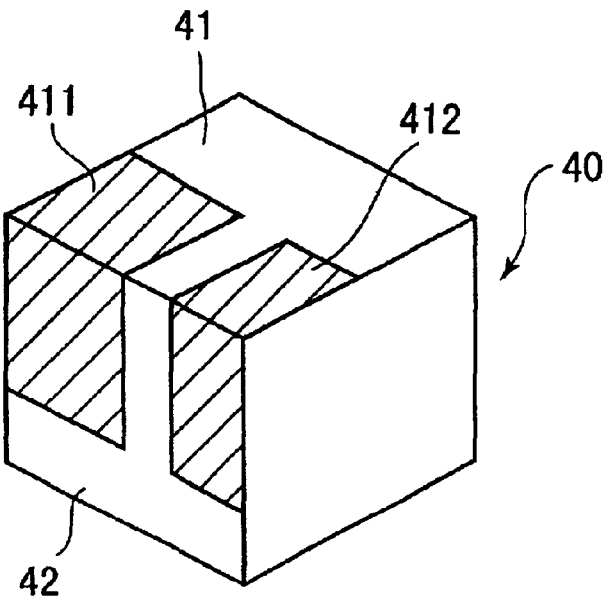
FIG. 26 is a perspective view for showing a conventional carrier for optical semiconductor device.
Figure 27:
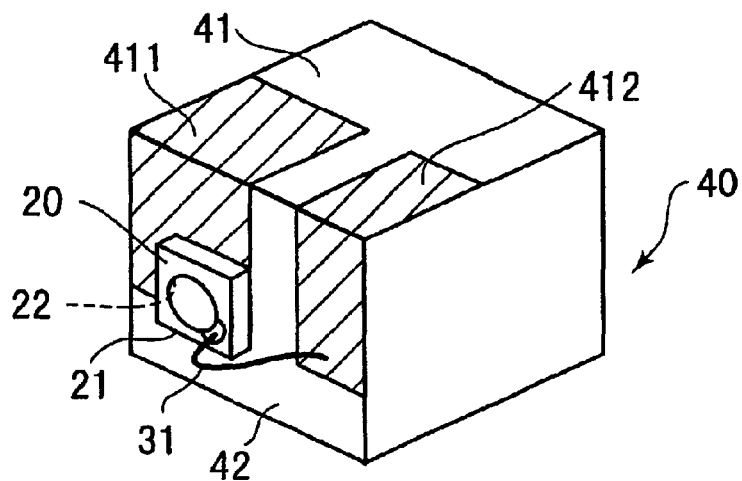
FIG. 27 is a perspective view for showing a conventional mounting structure of a photodiode on the carrier.
Figure 28A:
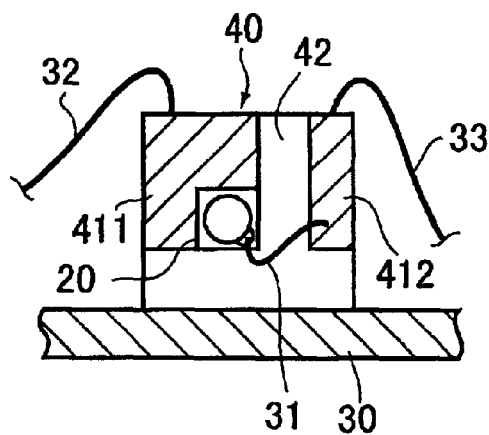
FIG. 28A is a front view for showing a conventional mounting structure of the photodiode on a silicon substrate using the carrier.
Figure 28B:
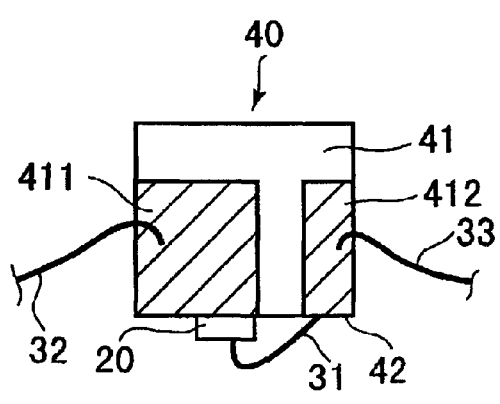
FIG. 28B is a plan view of the conventional mounting structure shown in FIG. 28A.
Figure 28C:
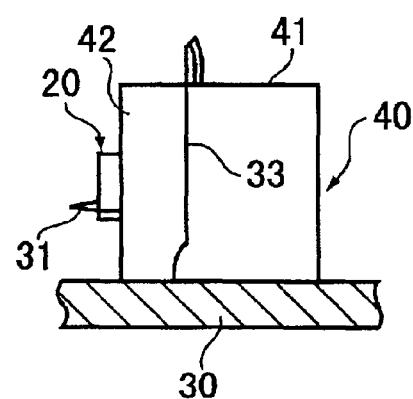
FIG. 28C is a side view of the conventional mounting structure shown in FIG. 28A.

A modification of the optical module in the third embodiment is shown in FIG. 25. The photo sensing device 440 is mounted above the light emitting device 430 on the front face 451 of the carrier 450. A light reflection groove 407 having a V-shaped section is formed on the substrate 401 in parallel with a channel 406 and perpendicular to a mounting groove 402 of the optical fiber 420. A reflection face of the light reflection groove 407 is metallized by Cr/Au or Ti/Pt/Au at the same time of forming electrodes 411 to 414, so that a part of the light beam emitted from the light emitting device 430 is effectively reflected toward the photo sensing device 440. The end face 421A of the optical fiber 420 is substantially perpendicular to the optical axis thereof.

Other Modification

In the above-mentioned embodiments, the front face of the carrier on which at least one optical semiconductor device is mounted is formed to be perpendicular to the top face (principal plane) of the substrate when the carrier is mounted on the substrate. The present invention is not restricted by the description of the embodiment. It is possible to form the front face of the carrier to be a predetermined angle with respect to the top face of the substrate. When a light beam exited from the end face of the optical fiber is sensed by the photo sensing device, it is preferable to be inclined the photo sensing region with respect to the end face of the optical fiber, so that the light reflected by the surface of the photo sensing device may not be reentered into the optical fiber.

When the single crystalline silicon is used as a material of the carrier and the substrate, the (100) surface is used as the front face of the carrier and the top face of the substrate. The photo sensing region of the photo sensing device will incline about 19.48 degrees with respect to the top face of the substrate, so that the reflection light by the photo sensing device cannot be reentered into the optical fiber.

Furthermore, in the second embodiment, two sets of the positioning guide grooves and the positioning protrusions are formed on the slant faces of the carrier and the substrate at the portion where the electrodes are formed. It, however, is possible to provide the positioning guide grooves and the positioning protrusions at a portion where the electrodes are not formed. Furthermore, the number of the positioning guide grooves and the positioning protrusions are not restricted by two. It is possible to provide only one set of the positioning guide groove and the positioning protrusion is provided substantially at the center of the slant faces. Alternatively, a plural sets of the positioning guide grooves and the positioning protrusions are provided in the vicinities of both sides of the slant faces. In other words, the number and the position of the positioning guide grooves and the positioning protrusions can optionally be selected.

This application is based on patent applications 2000-130986 and 2000-363504 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A carrier for optical semiconductor device having a device mounting face on which at least one optical semiconductor device is to be mounted and at least one positioning face slanted by a predetermined angle with respect to the device mounting face and disposed below a position at which the optical semiconductor device is mounted, wherein the device mounting face connects to the positioning face.

2. The carrier in accordance with claim 1, wherein at least one electrode, which is to be connected to the optical semiconductor device, is serially formed on the device mounting face and the positioning face.

3. The carrier in accordance with claim 1, wherein at least one convex or concave portion which will be used for positioning the carrier on a substrate is formed on the positioning face.

4. The carrier in accordance with claim 1, wherein the device mounting face corresponds to {110} surface equivalent to (110) surface or {100} surface equivalent to (100) surface of a single crystalline silicon and the positioning face corresponds to {111} surface equivalent to (111) surface of the single crystalline silicon.

5. The carrier in accordance with claim 1, wherein two positioning faces are formed symmetrically in a section perpendicular to the device mounting face.

6. A mounting structure of an optical semaconductor device comprising a carrier on which at least one optical semiconductor device is mounted and a substrate on which the carrier with the optical semiconductor device and another optical device are mounted, wherein the carrier has a device mounting face on which at least one optical semiconductor device is to be mounted and at least one first positioning face slanted by a first predetermined angle with respect to the device mounting face and disposed below a position at which the optical semiconductor device is mounted; and the substrate has at least one second positioning face slanted by a second predetermined angle with respect to a top face of the substrate to which the positioning face of the carrier is contacted.

7. The mounting structure in accordance with claim 6, wherein at least one first electrode to which the optical semiconductor device is connected is serially formed on the device mounting face and the first positioning face of the carrier, and at least one second electrode to which the first electrode is contacted is serially formed on the top face and the second positioning face of the substrate.

8. The mounting structure in accordance with claim 6, wherein at least one first convex or concave portion is formed on the first positioning face of the carrier and at least one second concave or convex portion engaged with the first convex or concave portion is formed on the second positioning face of the substrate.

9. The mounting structure in accordance with claim 6, wherein the device mounting face of the carrier corresponds to {110} surface equivalent to (110) surface or {100} surface equivalent to (100) surface of a single crystalline silicon, the first positioning face of the carrier corresponds to {111} surface equivalent to (111) surface of the single crystalline silicon, the top face of the substrate corresponds to {110} surface or {100} surface of a single crystalline silicon, and the second positioning face of the substrate corresponds to {111}surface of the single crystalline silicon.

10. The mounting structure in accordance with claim 6, wherein the device mounting face of the carrier is perpendicular to the top face of the substrate.

11. A mounting structure of an optical semiconductor device comprising a carrier on which at least one optical semiconductor device is mounted and a substrate on which the carrier with the optical semiconductor device and another optical device are mounted, wherein the carrier has a device mounting face on which at least one optical semiconductor device is to be mounted and at least one first positioning face slanted by a first predetermined angle with respect to the device mounting face and disposed below a position at which the optical semiconductor device is mounted; and the substrate has at least one second positioning face slanted by a second predetermined angle with respect to a top face of the substrate to which the positioning face of the carrier is contacted, wherein the substrate has a cavity having a trapezoidal section in which the carrier is mounted, two slanted faces of the cavity serve as the second positioning faces, and the first positioning faces of the carrier are formed symetrically in a section perpendicular to the device mounting face.

12. An optical module comprising a carrier, a substrate, at least one optical semiconductor device mounted on the carrier and at least one optical fiber mounted on the substrate so as to be optically coupled with the optical semiconductor device, wherein the carrier has a device mounting face on which the optical semiconductor device is to be mounted and at least one first positioning face slanted by a first predetermined angle with respect to the device mounting face and disposed below a position at which the optical semiconductor device is mounted; and the substrate has at least one second positioning face slanted by a second predetermined angle with respect to a top face of the substrate to which the positioning face of the carrier is contacted and at least one positioning groove in which the optical fiber is mounted in a manner so that an end face of the optical fiber face a functional face of the optical semiconductor device.

13. The optical module in accordance with claim 12, wherein a light emitting device and a photo sensing device are mounted on the same carrier, and the end face of the optical fiber is slanted for reflecting a part of a light beam emitted from the light emitting device toward the photo sensing device.

14. The optical module in accordance with claim 12, wherein a light emitting device and a photo sensing devine are mounted on the same carrier, and a reflection face is formed on the subatrate for reflecting a part of a light beam emitted from the light emitting device toward the photo sensing device.

15. The optical module in accordance with claim 12, wherein at least one first electrode to which the optical semiconductor device is connected is serially formed on the device mounting face and the first positioning face of the carrier, and at least one second electrode to which the first electrode is contacted is serially formed on the top face and the second positioning face of the substrate.

16. The optical module in accordance with claim 12, wherein at least one first convex or concave portion is formed on the first positioning face of the carrier and at least one second concave or convex portion engaged with the first convex or concave portion is formed on the second positioning face of the substrate.

17. The optical module in accordance with claim 12, wherein the device mounting face of the carrier corresponds to {110} surface equivalent to (110) surface or {100} surface equivalent to (100) surface of a single crystalline silicon, the first positioning face of the carrier corresponds to {111} surface equivalent to (111) surface of the single crystalline silicon, the top face of the substrate corresponds to {110} surface or {100} surface of a single crystalline silicon, and the second positioning face of the substrate corresponds to {111} surface of the single crystalline silicon.

18. The optical module in accordance with claim 12, wherein the device mounting face of the carrier is perpendicular to the top face of the substrate.

19. An optical module comprising a carrier, a substrate, at least one optical semiconductor device mounted on the carrier and at least one optical fiber mounted on the substrate so as to be optically coupled with the optical semiconductor device, wherein the carrier has a device mounting face on which the optical semiconductor device is to be mounted and at least one first positioning face slanted by a first predetermined angle with respect to the device mounting face and disposed below a position at which the optical semiconductor device is mounted; and the substrate has at least one second positioning face slanted by a second predetermined angle with respect to a top face of the substrate to which the positioning face of the carrier is contacted and at least one positioning groove in which the optical fiber is mounted in a manner so that an end face of the optical fiber face a functional face of the optical semiconductor device, wherein the substrate has a cavity having a trapezoidal section in which the carrier is mounted, two slanted faces of the cavity serve as the second positioning faces, and the first positioning faces of the carrier are formed symmetrically in a section perpendicular to the device mounting face.

* * * * *